E. J. SHAUT & W. A. DUNHAM.
TIRE.
APPLICATION FILED OCT. 31, 1912.
1,076,916.
Patented Oct. 28, 1913.
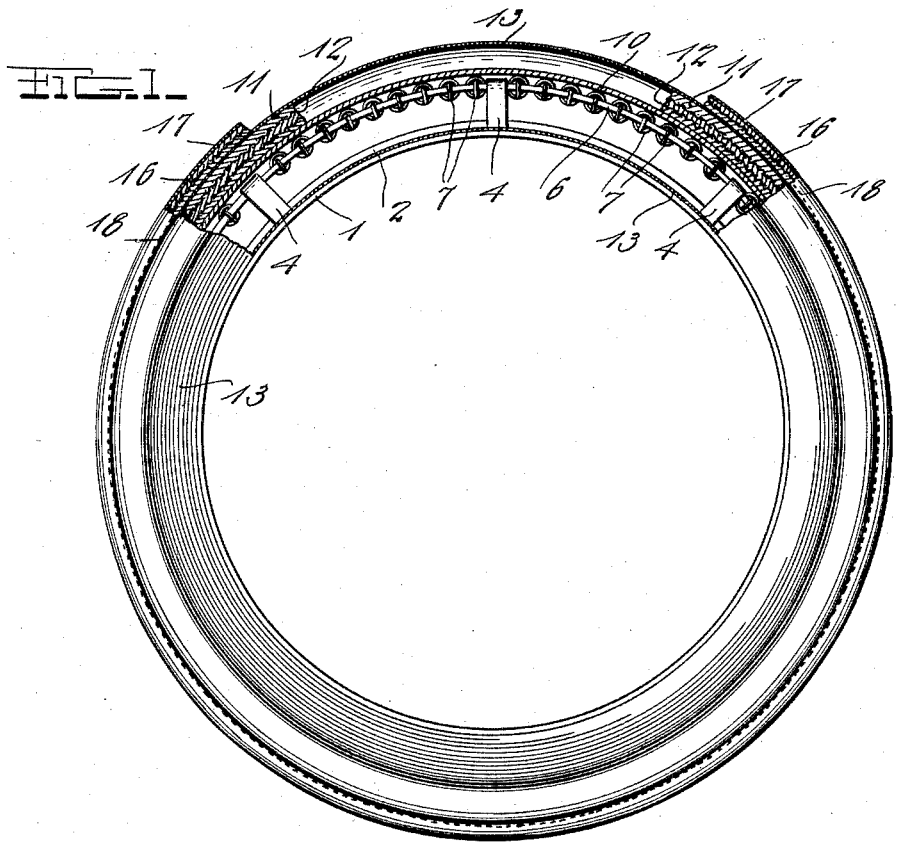
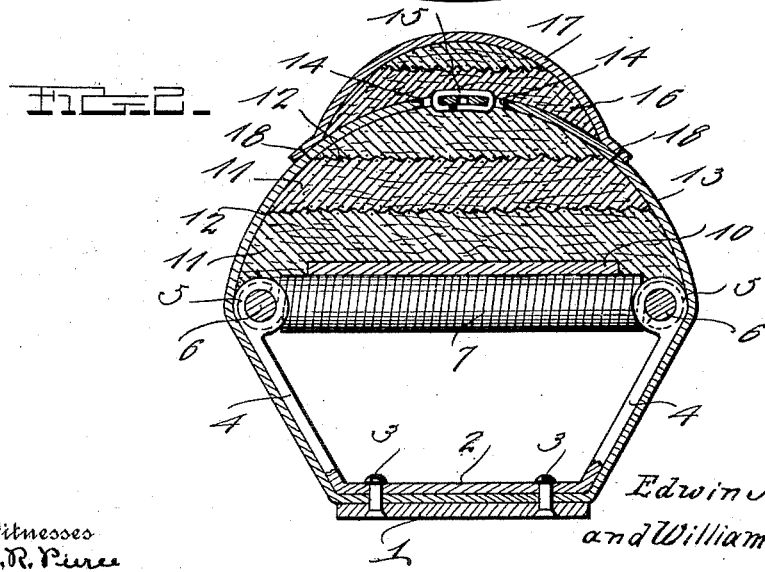
Witnesses
J. R. Pierce
N. L. Colamer
Inventors
Edwin J. Shaut
and William A. Dunham.
By H. B. Willson & Co.
Attorneys

UNITED STATES PATENT OFFICE.

EDWIN J. SHAUT AND WILLIAM A. DUNHAM, OF JACKSON, MICHIGAN.

TIRE.

1,076,916.  Specification of Letters Patent.  Patented Oct. 28, 1913.

Application filed October 31, 1912. Serial No. 728,895.

*To all whom it may concern:*

Be it known that we, EDWIN J. SHAUT and WILLIAM A. DUNHAM, citizens of the United States, residing at Jackson, in the county of Jackson and State of Michigan, have invented certain new and useful Improvements in Tires; and we do declare the following to be a full, clear, and exact description of the invention, such as will enable others skilled in the art to which it appertains to make and use the same.

This invention relates to resilient tires, and more especially to those including metallic springs; and the object of the same is to provide a cushion tire for use more especially on automobiles and motor vehicles, made up of coiled springs carried by and slightly remote from the rim, a body and a thread of peculiar composition, and an interposed leather strap so that the kneading action produced on the tread and body by the weight of the wheel and the superstructure will not wear the body where it comes in contact with the springs. This and other objects are accomplished by constructing our tire in the manner hereinafter more fully described and claimed, and as shown in the drawings wherein—

Figure 1 is a side elevation of a tire embodying our improvements, partly in longitudinal section. Fig. 2 is an enlarged cross section through this improved tire.

The rim of this improved tire comprises an inner metallic band 1, an outer metallic band 2 riveted around the inner at intervals as at 3 and provided with laterally projecting integral fingers 4 opposite the rivets which are bent outward at an angle between a line truly radial to the wheel and a line parallel with its axis and are formed with eyes 5 in their outer extremities; and two rings 6 of stout wire preferably of steel wire, running around the wheel through said eyes and standing in parallelism with each other. These rings are connected by a multiplicity of small helical springs 7, preferably made of steel wire and standing across the rim side by side but slightly out of contact with each other. Thus is built up a structure wherein the diverging fingers are connected in series around the wheel by the two steel rings, and the rings are connected with each other by the yielding means specified. Next outside the band which is made up of the multiplicity of fine springs 7, lies a leather strap 10 whose width is sufficient to cause it to extend throughout nearly the length of said springs, but whose thickness is not so great that it cannot flex as will be described. Overlying the strap 10 is a packing consisting of alternated layers of cotton felt 11 and fine wire mesh 12. The structure thus far described, excepting only the inner band 1, is inclosed in a casing 13 of canvas or the like, whose edges nearly meet along the outside of the body and carry eyelets 14 so that they may be laced as at 15. The tread of this improved tire, which can be built up as thick as the necessities of the case may demand, is made up of one or more additional layers 16 of cotton felt, covered by a sheet of canvas 17 which is stitched to the casing 13 along the two lines 18 and some distance outside the eyelets 14 as shown. Experiment has proven to us that a tire so made possesses the characteristic advantages of being cheap to make in heavier or lighter forms for different types of machines, durable to an extreme, and resilient by reason of its specific structure. That is to say, when weight is thrown upon the tread it is communicated thereby to the body and by the body to the leather strap, the strap pushes the band of steel springs inward between the rings 6, 6 so that resiliency results from the expansion of the coiled springs 7 and the inward deflection of the fingers 4. Meanwhile the tendency of the composite body is to push in between the rings which however it cannot do, and the result is that the body is compressed laterally by virtue of its own tendency and therefore better resists the load thrown upon it at this time; during this action and again when this part of the tire has passed the point where it touches the roadway, wear on the body while it is compressing and by means of the springs while they are expanding is prevented by the interposition of the strap 10; and finally if the wheel should happen to strike an obstruction so that a greater load is thrown onto the lowermost portion of the tire than usual, it is possible—even when the body is borne somewhat inward between the two rings 6—for it to be pushed yet a little farther without breaking any part. This follows from the fact that the casing 13 surrounds the body and the open space between the outer band 2 and the band of springs 7, and as said space increases in size by the lengthening of the springs 7, the body decreases in size by its lateral compression and the fact that it is pushed partly into said space—hence there is never a time when the expansive force of the internal portion of this tire is expended sufficiently to burst its own casing.

We do not wish to limit the casing to canvas, although we find that that fabric works well in this connection. Neither do we consider it always necessary to apply the tread which is shown and described, because for light vehicles the lacing and the double series of eyelets will answer quite well. But when the tread is employed, with its special canvas covering, we consider it also one of the important features of the invention because it takes most of the wear which the tire receives and substantially all of the punctures to which it is subjected, and when it becomes worn it can be replaced without removing the remainder of the tire from the rim or the rim from the wheel.

In connection with the suggestion thrown out toward the close of the last paragraph, it might be stated that we may employ any desired means for attaching the inner band of the rim to the felly of the wheel, and it is obviously quite possible to have said inner band extensible and contractible so as to be placed upon and reduced in size around the felly after the plan of the demountable rims now in common use upon motor vehicles. We do not wish to be limited to specific details, and the sizes and materials of parts are obviously unimportant.

What is claimed as new is:

The herein described cushion tire comprising a flat inner metal band, a flat outer metal band provided with pairs of integral spring fingers projecting obliquely outward from its opposite edges and formed with inturned eyes at their outer extremities, parallel steel rings extending through said eyes, a multiplicity of small coiled springs standing side by side and connected at their extremities with said rings, a leather strap surrounding the series of springs and narrower than their length, a packing overlying said strap, a casing passing between said bands and around the other elements, its edges being connected, and rivets connecting the two bands and passing through said casing.

In testimony whereof we have hereunto set our hands in presence of two subscribing witnesses.

EDWIN J. SHAUT.
WILLIAM A. DUNHAM.

Witnesses:
  JOHN C. FOX,
  ROBT. A. SMITH.

---

Copies of this patent may be obtained for five cents each, by addressing the "Commissioner of Patents, Washington, D. C."